US008401461B2

(12) United States Patent
Funabiki et al.

(10) Patent No.: US 8,401,461 B2
(45) Date of Patent: Mar. 19, 2013

(54) WIRELESS COMMUNICATION SYSTEM FOR WIRELESSLY TRANSMITTING SETTING INFORMATION OF DISPLAY UNIT

(75) Inventors: Makoto Funabiki, Osaka (JP); Akihiro Tatsuta, Kyoto (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 1101 days.

(21) Appl. No.: 12/279,112

(22) PCT Filed: Feb. 14, 2007

(86) PCT No.: PCT/JP2007/052584
§ 371 (c)(1),
(2), (4) Date: Jan. 12, 2009

(87) PCT Pub. No.: WO2007/094347
PCT Pub. Date: Aug. 23, 2007

(65) Prior Publication Data
US 2009/0322948 A1    Dec. 31, 2009

(30) Foreign Application Priority Data

Feb. 14, 2006 (JP) ................................ 2006-036600

(51) Int. Cl.
*H04N 7/12* (2006.01)
*H04N 11/02* (2006.01)
*H04N 11/04* (2006.01)
*H04H 40/00* (2008.01)

(52) U.S. Cl. ....... 455/3.06; 348/471; 348/472; 348/473; 348/469; 348/476; 348/477; 348/478

(58) Field of Classification Search ................. 455/3.06; 348/471–473, 469, 476–478
See application file for complete search history.

(56) References Cited

U.S. PATENT DOCUMENTS

| | | | |
|---|---|---|---|
| 6,914,637 B1 * | 7/2005 | Wolf et al. | 348/473 |
| 6,992,987 B2 * | 1/2006 | Kobayashi | 370/252 |
| 7,324,738 B2 | 1/2008 | Sugimoto | |
| 7,378,984 B2 | 5/2008 | Suzuki et al. | |
| 7,817,586 B2 * | 10/2010 | Hsieh | 370/282 |
| 2006/0143679 A1 | 6/2006 | Yamada et al. | |
| 2010/0290508 A1 * | 11/2010 | Gilliland | 375/220 |
| 2010/0309962 A1 * | 12/2010 | Freundlich et al. | 375/219 |

FOREIGN PATENT DOCUMENTS

| | | |
|---|---|---|
| JP | 2002-32069 | 1/2002 |
| JP | 2003-87251 | 3/2003 |
| JP | 2004-15104 | 1/2004 |
| JP | 2004-208290 | 7/2004 |
| JP | 2005-102186 | 4/2005 |
| JP | 2005-514873 | 5/2005 |
| WO | 2005/006740 | 1/2005 |

* cited by examiner

OTHER PUBLICATIONS

International Search Report issued Apr. 24, 2007 in the International (PCT) Application No. PCT/JP2007/052584.
High-Definition Multimedia Interface Specification, Version 1.1, HDMI Licensing, LLC, California in U.S.A., May 20, 2004.

*Primary Examiner* — Bobbak Safaipour
(74) *Attorney, Agent, or Firm* — Wenderoth, Lind & Ponack, L.L.P.

(57) ABSTRACT

In a wireless communication system including a source device for wirelessly transmitting a video signal, and a sink device for receiving the wirelessly transmitted video signal and displaying the received video signal on a display, the sink device reads out EDID information from a ROM and wirelessly transmits a wireless data signal including the EDID information to the source device. The source device wirelessly receives the wireless data signal including the EDID information and wirelessly transmitted from the sink device, and wirelessly transmits the video signal to the sink device based on the EDID information.

9 Claims, 9 Drawing Sheets

Fig.3
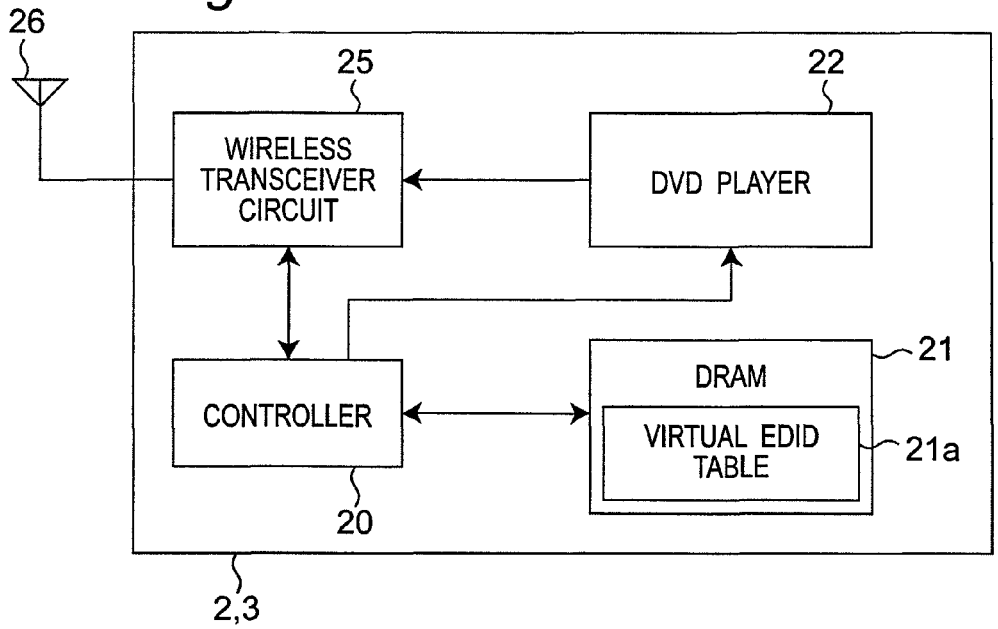
Fig.4
NODE INFORMATION TABLE 12b
| IDENTIFICATION NO. | DEVICE ID | PHYSICAL ADDRESS |
|---|---|---|
| 1 | A | 1. 0. 0. 0 |
| 2 | B | 2. 0. 0. 0 |
| 3 | C | 3. 0. 0. 0 |
| ⋮ | ⋮ | ⋮ |
Fig.5
FORMAT OF EDID REQUEST SIGNAL
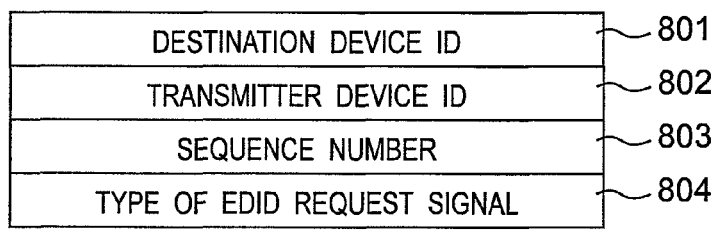

Fig. 6

FORMAT OF EDID RESPONSE SIGNAL

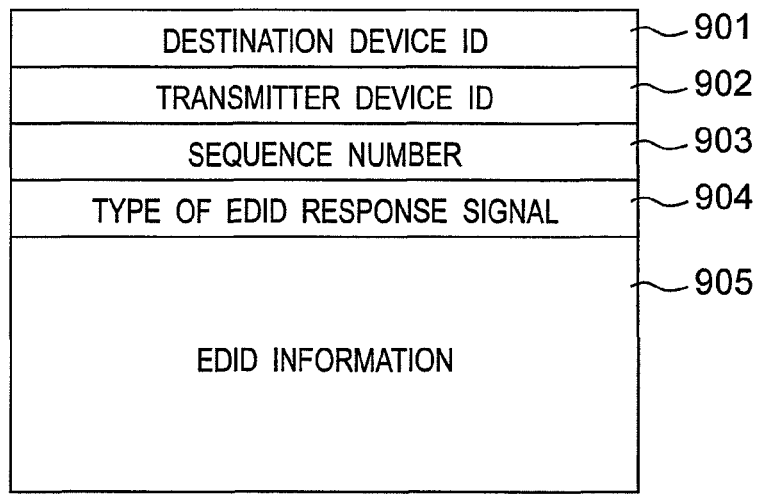

| DESTINATION DEVICE ID | ~901 |
| TRANSMITTER DEVICE ID | ~902 |
| SEQUENCE NUMBER | ~903 |
| TYPE OF EDID RESPONSE SIGNAL | ~904 |
| EDID INFORMATION | ~905 |

Fig. 7

FORMAT OF CONNECTION COMPLETION NOTIFICATION SIGNAL

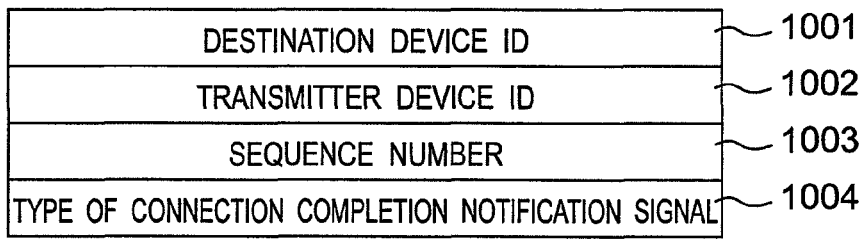

| DESTINATION DEVICE ID | ~1001 |
| TRANSMITTER DEVICE ID | ~1002 |
| SEQUENCE NUMBER | ~1003 |
| TYPE OF CONNECTION COMPLETION NOTIFICATION SIGNAL | ~1004 |

Fig. 8

FORMAT OF CONNECTION COMPLETION RESPONSE SIGNAL

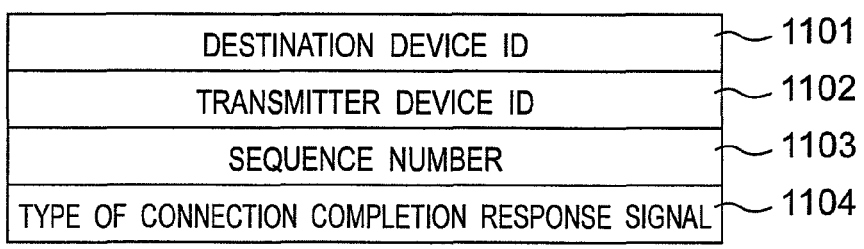

| DESTINATION DEVICE ID | ~1101 |
| TRANSMITTER DEVICE ID | ~1102 |
| SEQUENCE NUMBER | ~1103 |
| TYPE OF CONNECTION COMPLETION RESPONSE SIGNAL | ~1104 |

Fig. 14

| WIRELESS DATA TRANSMISSION RATE | DELETED VIDEO FORMAT |
|---|---|
| 3Gbps OR LOWER | 1080p |
| 1.5Gbps OR LOWER | 1080p, 1080i |
| 1.3Gbps OR LOWER | 1080p, 1080i, 720p |
| 0.5Gbps OR LOWER | 1080p, 1080i, 720p, 480p |

WIRELESS COMMUNICATION SYSTEM FOR WIRELESSLY TRANSMITTING SETTING INFORMATION OF DISPLAY UNIT

TECHNICAL FIELD

The present invention relates to a sink device, a source device, an adapter device for the sink device, an adapter device for the source device, a wireless communication system, and a method of controlling the wireless communication system for wirelessly transmitting and receiving setting information of display means, in the wireless communication system for wirelessly transmitting and receiving a video signal according to HDMI (High-Definition Multimedia Interface) standard.

BACKGROUND ART

Patent Document 1 discloses a transmission system for transmitting and receiving EDID (Extended Display Identification Data) via a wired communication to set a physical address in the HDMI (High-Definition Multimedia Interface). The transmission system of the Patent Document 1 includes a receiver, a transmitter and a serial link, and encoded data (e.g., video, audio, and additional other auxiliary data) is transmitted from the transmitter to the receiver.

Patent Document 1: Japanese patent laid-open publication No. JP-2005-514873-T.

Non-Patent Document 1: High-Definition Multimedia Interface Specification, Version 1.1, HDMI Licensing, LLC, California in U.S.A., May 20, 2004.

SUMMARY OF THE INVENTION

However, the transmission method and the transmissions system disclosed in the Patent Document 1 have the following problems. The wired communication is used in order to transmit and receive the EDID to set the physical address, and this leads to pell-mell wirings in appearance. In addition, only one communication device can communicate with only one communication device per one wiring. Accordingly, each time the communication device communicates with one of the other communication devices, the cable should be removed and be connected to another wireless communication devices, and this requires a tremendous labor.

In addition, since a DDC (Display Data Channel) provided between the communication devices is used to read the EDID information, it takes much time to read the EDID information.

An essential object of the present invention is to provide a sink device, a source device, an adapter device for the sink device, an adapter device for the source device, a wireless communication system, and a method of controlling the wireless communication system each capable of solving the above-mentioned problems, making simple appearance without using any cables, making it possible for one sink device to easily communicate with a plurality of source devices, and realizing high-speed reading of setting information on display means as compared with a prior art.

According to the first aspect of the present invention, there is provided a sink device for use in a wireless communication system including a source device for wirelessly transmitting a video signal, and the sink device for receiving the wirelessly transmitted video signal and displaying the received video signal on display means. The sink device is characterized by including first storage means for storing setting information on the display means, wireless transmitter means for wirelessly transmitting a predetermined wireless data signal to the source device, and controller means. The controller means reads out the setting information from the first storage means, and controls the wireless transmitter means to wirelessly transmit a wireless data signal including the read-out setting information.

The above-mentioned sink device may further includes second storage means for storing the setting information read out from the first storage means. In this case, the controller means reads out the setting information from the first storage means, stores the read-out setting information in the second storage means, and reads out the setting information from the second storage means. In this case, a readout rate for the second storage means may be higher than a readout rate for the first storage means.

In addition, in the above-mentioned sink device, the second storage means may further store a node information table for storing first identification information on the source device included in the wireless data signal from the source device, and second identification information allocated to the source device, so that the first identification information corresponds to the second identification information. In this case, upon wirelessly receiving the wireless data signal from the source device, the controller means reads out the second identification information corresponding to the first identification information included in the wirelessly received wireless data signal from the node information table, and controls the wireless transmitter means to wirelessly transmit a wireless data signal including the second identification information and the setting information read out from the second storage means, to the source device. In this case, in response to a request signal from the source device, the controller means may control the wireless transmitter means to wirelessly transmit the wireless data signal including the second identification information and the setting information read out from the second storage means, to the source device.

Further, in the above-mentioned sink device, upon reading out the setting information from the first storage means and storing the read-out setting information in the second storage means, the controller means may select at least a part of the setting information and stores the selected part of the setting information in the second storage means. In this case, at least the part of the setting information may be setting information that can be transmitted at a wireless transmission rate at which the sink device can receive.

Still further, in the above-mentioned sink device, the first identification information may be a device ID, and the second identification information may be a physical address.

According to the second aspect of the present invention, there is provided a source device for use in a wireless communication system including the source device for wirelessly transmitting a video signal, and a sink device for receiving the wirelessly transmitted video signal and displaying the received video signal on display means. In this case, the source device is characterized by including wireless transceiver means for wirelessly receiving a wireless data signal including the setting information and wirelessly transmitted from the sink device, and for wirelessly transmitting a video signal to the sink device based on the setting information.

According to the third aspect of the present invention, there is provided a wireless communication system characterized by including the above-mentioned sink device and the above-mentioned source device.

According to the fourth aspect of the present invention, there is provided a method of controlling a wireless communication system including a source device for wirelessly transmitting a video signal, and a sink device for receiving the wirelessly transmitted video signal and displaying the received video signal on display means. In this case, the sink device includes first storage means for storing setting information on the display means. The method is characterized by including the steps of at the sink device, reading out the setting information from the first storage means, and wirelessly transmitting a wireless data signal including the read-out setting information to the source device, and at the source device, wirelessly receiving the wireless data signal including the setting information and wirelessly transmitted from the sink device, and wirelessly transmitting the video signal to the sink device based on the setting information.

According to the fifth aspect of the present invention, there is provided an adapter device for a sink device, for use in a wireless communication system including an adapter device for a source device and the adapter device for the sink device, the adapter device for the sink device wirelessly transmitting a video signal, the adapter device for the source device receiving the wirelessly transmitted video signal and outputting the received video signal to display means of the sink device to display the received video signal thereon. In this case the adapter device for the sink device is characterized by including, wireless transmitter means for wirelessly transmitting a predetermined wireless data signal to the adapter device for the source device, storage means for storing setting information read out from the sink device; and controller means for reading out the setting information from the storage means, and controlling the wireless transmitter means to wirelessly transmit a wireless data signal including the read-out setting information to the adapter device for the source device.

In the above-mentioned adapter device for the sink device, the storage means may further store a node information table for storing first identification information on the source device included in the wireless data signal from the adapter device for the source device, and second identification information allocated to the source device, so that the first identification information corresponds to the second identification information. In addition, upon wirelessly receiving the wireless data signal from the adapter device for the source device, the controller means may read out the second identification information corresponding to the first identification information included in the wirelessly received wireless data signal from the node information table, and control the wireless transmitter means to wirelessly transmit a wireless data signal including the second identification information and the setting information read out from the storage means, to the adapter device for the source device. In this case, in response to a request signal from the adapter device for the source device, the controller means may control the wireless transmitter means to wirelessly transmit the wireless data signal including the second identification information and the setting information read out from the second storage means, to the adapter device for the source device.

According to the sixth aspect of the present invention, there is provided an adapter device for the source device, for use in a wireless communication system including the adapter device for the source device and an adapter device for a sink device, the adapter device for the sink device wirelessly transmitting a video signal, the adapter device for the source device receiving the wirelessly transmitted video signal and outputting the received video signal to display means of the sink device to display the received video signal thereon. In this case, the adapter device for the source device is characterized by including wireless transceiver means for wirelessly receiving a wireless data signal including the setting information and wirelessly transmitted from the adapter device for the sink device, and for wirelessly transmitting a video signal to the adapter device for the sink device based on the setting information.

According to the seventh aspect of the present invention, there is provided a wireless communication system characterized by including the above-mentioned adapter device for the sink device, and the above-mentioned adapter device for the source device.

According to the eighth aspect of the present invention, there is provided a method of controlling a wireless communication system including an adapter device for a source device and an adapter device for a sink device, the adapter device for the sink device wirelessly transmitting a video signal, the adapter device for the source device receiving the wirelessly transmitted video signal and outputting the received video signal to display means of the sink device to display the received video signal thereon. In this case, the method is characterized by including the steps of at the adapter device for the sink device, storing setting information read out from the sink device in storage means, at the adapter device for the sink device, reading out the setting information from the storage means, and wirelessly transmitting a wireless data signal including the read-out setting information to the adapter device for the source device, and at the adapter device for the source device, wirelessly receiving the wireless data signal including the setting information and wirelessly transmitted from the adapter device for the sink device, and wirelessly transmitting a video signal to the adapter device for the sink device based on the setting information.

Therefore, according to the sink device, the source device, the adapter device for the sink device, the adapter device for the source device, the wireless communication system, and the method of controlling the wireless communication system according to the present invention, the setting information on the display means of the sink device is transmitted and received via a wireless circuit. Accordingly, it is possible to make simple appearance without using any cables, allow one sink device to easily communicate with a plurality of source devices, and realize high-speed reading of the setting information on the display means as compared with a prior art.

Further, by reading out the second identification information corresponding to the first identification information included in the wireless data signal from the source device, and wirelessly transmitting a wireless data signal including the second identification information to the source device, it is possible to easily set the second identification information to each of the source device

BRIEF DESCRIPTION OF THE DRAWINGS

FIG. 3 is a block diagram showing a detailed configuration of each of source devices 2 and 3 of FIG. 1.

FIG. 4 is a table showing an example of a node information table 12b of FIG. 2.

FIG. 5 is a signal configuration diagram showing an example of a format of an EDID request signal wirelessly transmitted from the source device 2 or 3 to the sink device 1 in the wireless communication system of FIG. 1.

FIG. 6 is a signal configuration diagram showing an example of a format of an EDID response signal wirelessly transmitted from the sink device 1 to the source device 2 or 3 in the wireless communication system of FIG. 1.

FIG. 7 is a signal configuration diagram showing an example of a format of a connection completion notification signal wirelessly transmitted from the source device 2 or 3 to the sink device 1 in the wireless communication system of FIG. 1.

FIG. 8 is a signal configuration diagram showing an example of a format of a connection completion response signal wirelessly transmitted from the sink device 1 to the source device 2 or 3 in the wireless communication system of FIG. 1.

FIG. 14 is a table showing deleted video formats for respective wireless data transmission rates in a wireless communication system according to a modified embodiment of the first embodiment of the present invention.

DESCRIPTION OF REFERENCE SYMBOLS 1 and 1A . . . Source device;
2, 2A and 3 . . . Sink device;
9 . . . Audio signal and video signal processing circuit;
10, 20, 10A, 20A, 30 and 40 . . . Controller;
11 . . . ROM;
12, 21, 34 and 44 . . . DRAM;
13 . . . Display;
14 . . . Loudspeaker;
15, 25, 32 and 42 . . . Wireless transceiver circuit;
16, 26, 36 and 46 . . . Antenna;
22 . . . DVD player;
31, 33, 41 and 43 . . . Wired transceiver circuit;
35 . . . Adapter device for the sink device; and
45 . . . Adapter device for the source device.

DETAILED DESCRIPTION OF THE INVENTION

First Embodiment

Figure 1:
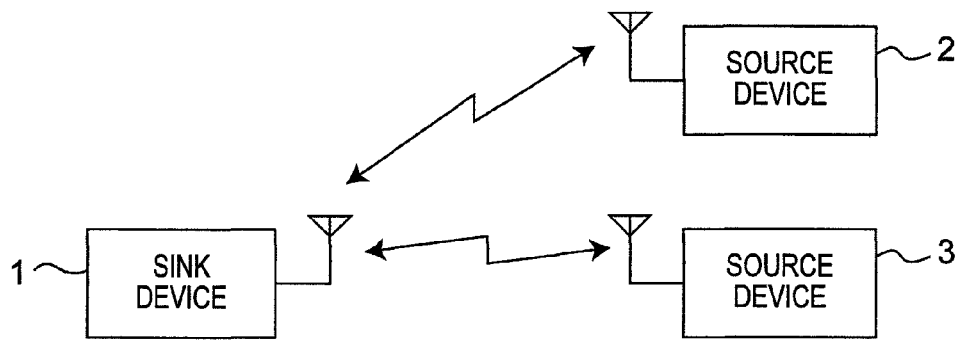
FIG. 1 is a block diagram showing a configuration of a wireless communication system according to a first embodiment of the present invention.

FIG. 1 is a block diagram showing a configuration of a wireless communication system according to a first embodiment of the present invention. Referring to FIG. 1, the wireless communication system according to the present embodiment is configured to include a sink device 1 including, for example, a television receiver, and source devices 2 and 3 each including, for example, a DVD player. The sink device 1 and the source devices 2 and 3 wirelessly transmit an receive a wireless signal including a CEC (Consumer Electronics Control) message to and from each other. FIG. 1 shows such a case in which one sink device 1 wirelessly communicates with two source devices 2 and 3. However, one sink device 1 and one source device may wirelessly communicate with each other, one sink device 1 and three source devices may wirelessly communicate with each other, and the sink device 1 may wirelessly communicate with a repeater device in stead of the source device.

Figure 2:
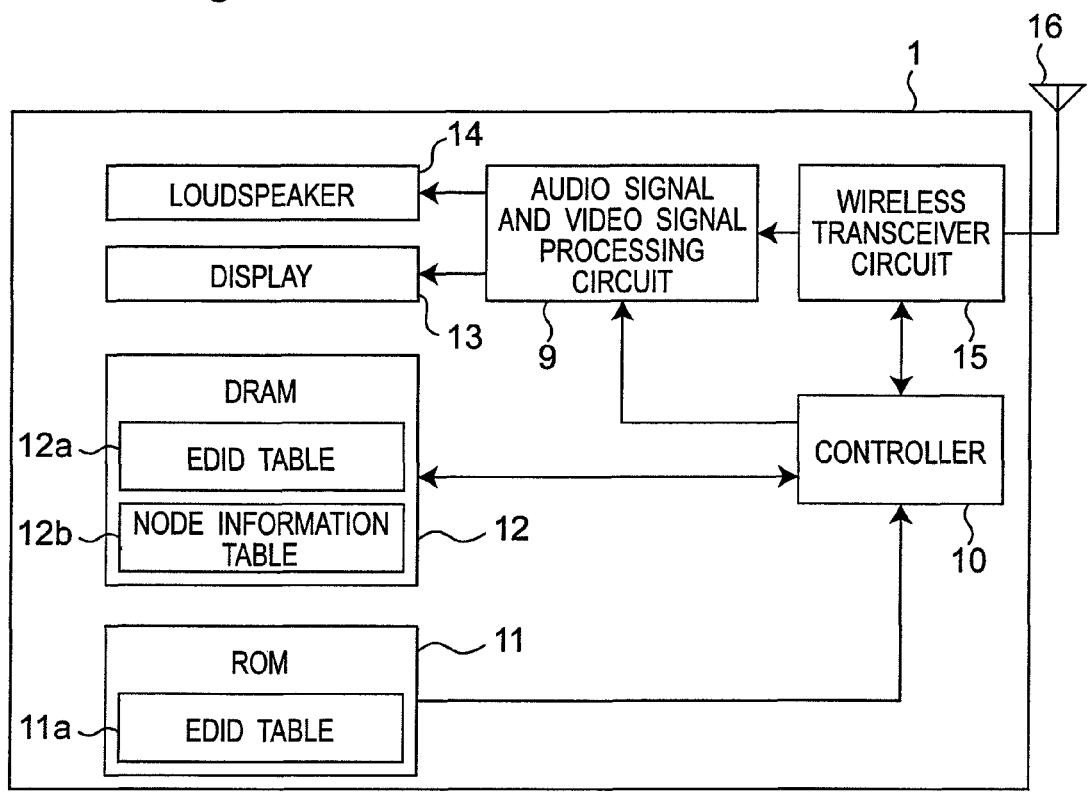
FIG. 2 is a block diagram showing a detailed configuration of a sink device 1 of FIG. 1.

FIG. 2 is a block diagram showing a detailed configuration of the sink device 1 of FIG. 1. Referring to FIG. 2, the sink device 1 is configured to include a controller 10, an audio signal and video signal processing circuit 9, a ROM 11, a DRAM 12, a display 13, a loudspeaker 14, a wireless transceiver circuit 15, and an antenna 16. The wireless transceiver circuit 15 performs a frequency conversion process, a received packet process, and a decoding process on a wireless AV signal transmitted from the source device 2 or 3 via the antenna 16, and outputs the processed AV signal including a video signal and an audio signal to the audio signal and video signal processing circuit 9. In addition, the wireless transceiver circuit 15 performs a frequency conversion process, a received packet process, and a decoding process on a wireless data signal received via the antenna 16, and outputs the processed data signal to the controller 10. In addition, the wireless transceiver circuit 15 encodes a data signal outputted from the controller 10, generates a transmitting packet, modulates a carrier wave having a predetermined frequency according to the transmitting to generate a wireless data signal, and transmits the wireless data signal to the source device 2 or 3 via the antenna 16.

The audio signal and video signal processing circuit 9 separates the AV signal outputted from the wireless transceiver circuit 15 into a video signal and an audio signal, outputs the video signal to the display 13 to display the video signal thereon, and outputs the audio signal to the loudspeaker 14. For realizing the plug-and-play, the ROM 11 stores an EDID table 11a including EDID information of setting information on the display 13 such as a resolution of the display 13. The DRAM 12 stores an EDID table 12a and a node information table 12b to be described later with reference to FIG. 4. Generally speaking, a readout rate for reading out data from the DRAM 12 is higher than that for reading out data from the ROM 11.

The controller 10 generates a data signal including control signals (including an authentication request signal, an authentication completion signal, an EDID request signal, an EDID response signal, a connection completion notification signal, and a connection completion response signal) for setting a physical address of the source device 2 or 3 to the sink device 1, and outputs the generated data signal to the wireless transceiver circuit 15. In addition, the controller 15 executes a wireless connection process (to be described later with reference to FIG. 9) based on a data signal received from the source device 2 or 3 via the antenna 16 and the wireless transceiver circuit 15. In addition, the controller 10 executes reading out of data from the ROM 11, reading out of data from the DRAM 12, writing of data to the DRAM 12, and control over the audio signal and video signal processing circuit 9.

FIG. 3 is a block diagram showing a detailed configuration of each of the source devices 2 and 3 of FIG. 1. Referring to FIG. 3, each of the source devices 2 and 3 is configured to include a controller 20, a DRAM 21, a DVD player 22, a wireless transceiver circuit 25, and an antenna 26. The DVD player 22 reads out a video signal and an audio signal recorded in a recording medium such as a DVD, and outputs the read-out video signal and audio signal to the wireless transceiver circuit 25 under control of the controller 20. The wireless transceiver circuit 25 encodes the video signal and the audio signal read out by the DVD player 22, generates a transmitting packet, modulates a carrier wave having a predetermined frequency according to the generated transmitting packet to generate a wireless AV signal, and transmits the wireless AV signal to the sink device 1 via the antenna 26. In addition, the wireless transceiver circuit 25 encodes a data signal outputted from the controller 20, generates a transmitting packet, modulates a carrier wave having a predetermined frequency according to the generated transmitting packets to generate a wireless data signal, and transmits the wireless data signal to the sink device 2 via the antenna 26. In addition, the wireless transceiver circuit 25 receives a wireless data signal having a predetermined frequency from the sink device 1 via the antenna 26, performs a frequency conversion process, a received packet process, and a decoding process on the received wireless data signal, and outputs the processed data signal to the controller 20.

The controller 20 generates a data signal including control signals for setting the physical address of the source device 2 or 3 to the sink device 1, and outputs the generated data signal to the wireless transceiver circuit 25. In addition, the controller 20 executes a wireless connection process (to be described later with reference to FIG. 10) based on a data signal received from the sink device 1 via the antenna 26 and the wireless transceiver circuit 25. In addition, the controller 20 executes reading out of data from the DRAM 21, writing of data to the DRAM 21, and control over the DVD player 22.

FIG. 4 is a table showing an example of the node information table 12b of the sink device 1 of FIG. 2. The node information table 12b of FIG. 4 stores identification numbers of the source devices 2 and 3 wirelessly communicating with the sink device 1, device IDs of the respective source devices 2 and 3, and physical addresses of the respective source devices 2 and 3 in the HDMI, so that the identification numbers, the device IDs and the physical addresses correspond to each other. In this case, for example, the device IDs are MAC addresses of the source devices 2 and 3 in a wireless interface, where each of the source devices 2 and 3 has completed wireless connection process with the sink device 1. The physical address allocated to each source device is set to one of values from "0.0.0.0" to "F.F.F.F", and a physical address "0.0.0.0", for example, is preliminary allocated to the sink device 1 itself.

FIGS. 5 and 6 are signal configuration diagrams showing examples of formats of the EDID request signal and the EDID response signal, respectively. Referring to FIG. 5, the format of the EDID request signal includes a destination device ID region 801, a transmitter device ID region 802, a sequence number region 803, and a type region 804. The destination device ID region 801 stores a device ID of the sink device 1 of a destination device, to which the EDID request signal is transmitted. The transmitter device ID region 802 stores the device ID of the source device 2 or 3 of a transmitter device transmitting the EDID request signal. The sequence number region 803 stores a sequence number according to an internal counter of the controller 20. The type region 804 stores a value indicating a type of the EDID request signal. Referring to FIG. 6, the format of the EDID response signal includes a destination device ID region 901, a transmitter device ID region 902, a sequence number region 903, a type region 904, and an EDID information region 905. The destination device ID region 901 stores the device ID of the source device 2 or 3 of a destination device, to which the EDID response signal is transmitted. The transmitter device ID region 902 stores the device ID of the sink device 1 of a transmitter device transmitting the EDID response signal. The sequence number region 903 stores a value which is the same as the value included in the sequence number region 803 of the EDID request signal of FIG. 5. The type region 904 stores a value indicating a type of the EDID response signal. The EDID information region 905 stores EDID information read out from the EDID table 12a of the DRAM 12.

FIGS. 7 and 8 are signal configuration diagrams showing examples of formats of the connection completion notification signal and the connection completion response signal, respectively. Referring to FIG. 7, the format of the connection completion notification signal includes a destination device ID region 1001, a transmitter device ID region 1002, a sequence number region 1003, and a type region 1004. The destination device ID region 1001 stores the device ID of the sink device 1 of a destination device, to which the connection completion notification signal is transmitted. The transmitter device ID region 1002 stores the device ID of the source device 2 or 3 of a transmitter device transmitting the connection completion notification signal. The sequence number region 1003 stores a sequence number according to an internal counter. The type region 1004 stores a value indicating a type of the connection completion notification signal. Referring to FIG. 8, the format of the connection completion response signal includes a destination device ID region 1101, a transmitter device ID region 1102, a sequence number region 1103, and a type region 1104. The destination device ID region 1101 stores the device ID of the source device 2 or 3 of a destination device, to which the connection completion response signal is transmitted. The transmitter device ID region 1102 stores the device ID of the sink device 1 of a transmitter device transmitting the connection completion response signal. The sequence number region 1103 stores a value the same as the value included in the sequence number region 1003 of the connection completion notification signal. The type region 1104 stores a value indicating a type of the connection completion response signal.

Figure 9:
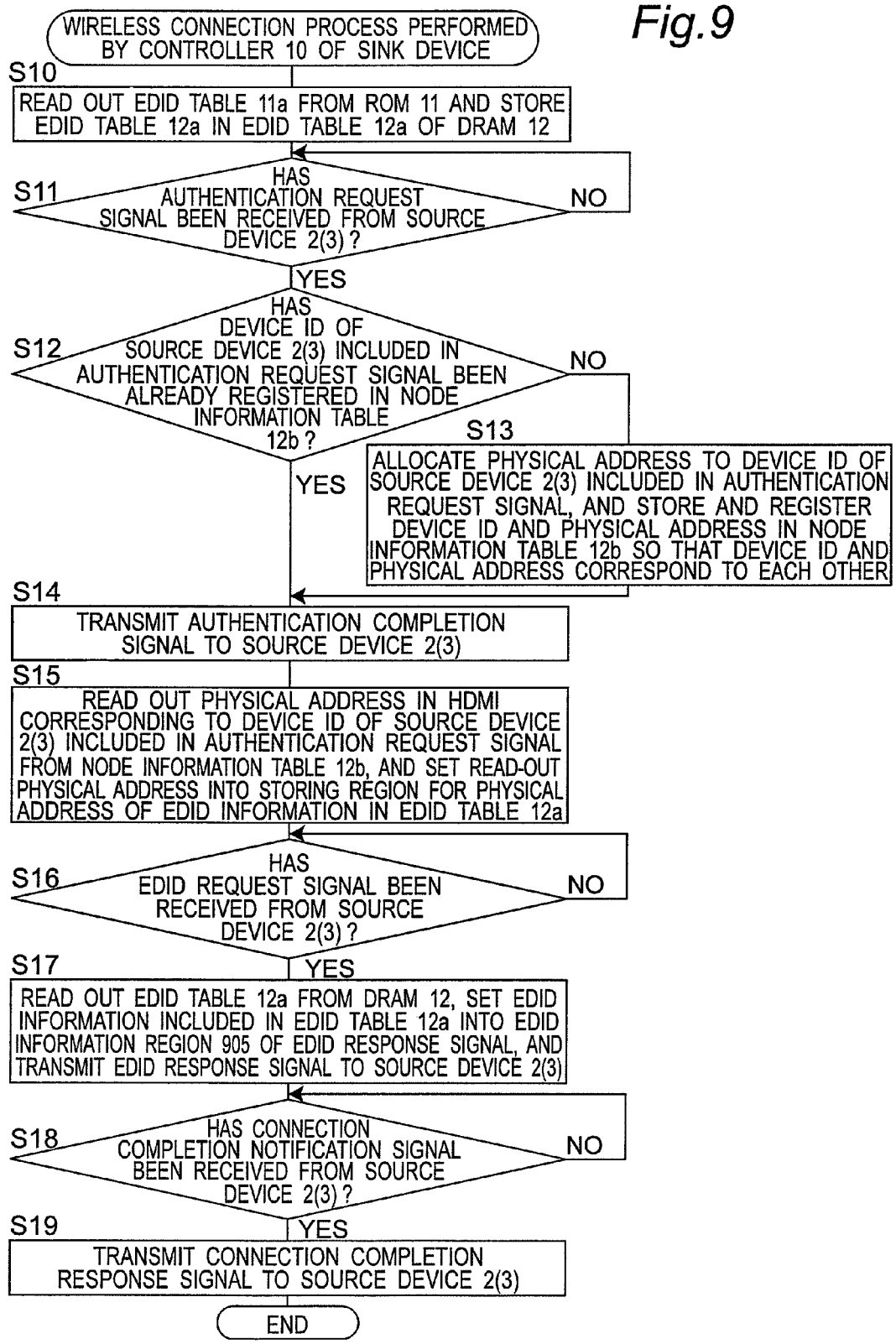
FIG. 9 is a flowchart showing a wireless connection process performed by a controller 10 of the sink device 1 of FIG. 1.

FIG. 9 is a flowchart showing the wireless connection process performed by the controller 10 of the sink device 1 of FIG. 1. Referring to FIG. 9, first of all, at step S10, the controller 10 reads out the EDID table 11a from the ROM 11 using a DDC, and stores the EDID table 11a in the EDID table 12a of the DRAM 12. Next, at step S11, it is determined whether or not an authentication request signal has been received from the source device 2. If YES at step S11, the control flow goes to step S12. On the other hand, if NO at step S11, the control flow returns to step S11, and the process of step S11 is repeated. At step S12, the controller 10 determines whether or not the device ID of the source device 2 included in the authentication request signal has already been stored in the node information table 12b so as to perform an authentication process. If YES at step S12, the control flow goes to step S14. On the other hand, if NO at step S12, the control flow goes to step S13. At step S13, the controller 10 allocates a physical address to the device ID of the source device 2 included in the authentication request signal, and stores and registers the device ID and the physical address in the node information table 12b so that the device ID and the physical address correspond to each other. At step S14, the controller 10 transmits an authentication completion signal to the source device 2.

At step S15, the controller 10 reads out a physical address (e.g., 1.0.0.0) in the HDMI corresponding to the device ID of the source device 2 included in the authentication request signal, from the node information table 12b, and sets the read-out physical address into a storage region for the physical address of the EDID information in the EDID table 12a. At step S16, it is determined whether or not an EDID request signal has been received from the source device 2. If YES at step S16, the control flow goes to step S17. On the other hand, if NO at step S16, the control flow returns to step S16, and the process of step S16 is repeated. At step S17, the controller 10 reads out the EDID table 12a from the DRAM 12, sets the EDID information included in the EDID table 12a into the EDID information region 905 of an EDID response signal, and transmits the EDID response signal to the source device 2. At step S18, it is determined whether or not t a connection completion notification has been received from the source device 2. If YES at step S18, the control flow goes to step S19. On the other hand, if NO at step S18, the control flow returns to step S18, and the process of step S18 is repeated. At step S19, the controller 10 transmits a connection completion response signal to the source device 2, and the process is completed. The wireless connection process performed by the controller 10 of the sink device 1 stated above is similarly executed for the source device 3.

Figure 10:
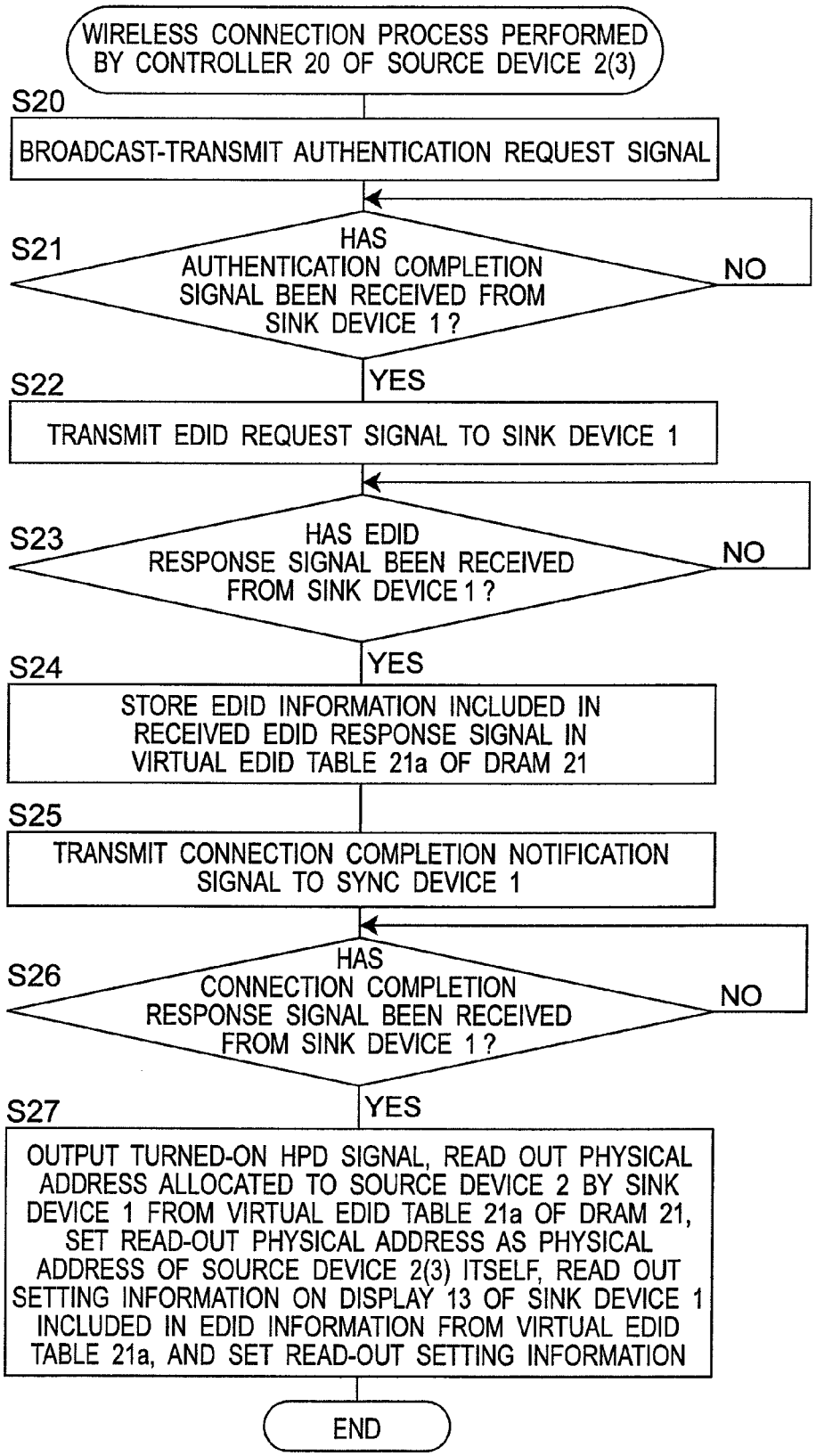
FIG. 10 is a flowchart showing a wireless connection process performed by a controller 20 of the source device 2 or 3 of FIG. 1.

FIG. 10 is a flowchart showing the wireless connection process performed by the controller 20 of the source device 2. Referring to FIG. 10, first of all, at step S20, the controller 20 of the source device 2 broadcast-transmits the authentication request signal. At step 21, it is determined whether or not the authentication completion signal has been received from the sink device 1. If YES at step S21, the control flow goes to step S22. On the other hand, if NO at step S21, the control flow returns to step S21, and the process of step S21 is repeated. At step S22, the controller 20 transmits the EDID request signal to the sink device 1. At step S23, it is determined whether or not the EDID response signal has been received from the sink device 1. If YES at step S23, the control flow goes to step S24. On the other hand, if NO at step S23, the control flow returns to step S23, and the process of step S23 is repeated. Next, at step S24, the controller 20 stores the EDID information included in the received EDID response signal in a virtual EDID table 21a of the ROM 21. At step S25, the controller 20 transmits the connection completion notification signal to the sink device 1. Next, at step S26, it is determined whether or not the connection completion response signal has been received from the sink device 1. If YES at step S26, the control flow goes to step S27. On the other hand, if NO at step S26, the control flow returns to step S26, and the process of step S26 is repeated. At step S27, the controller 20 outputs a turned-on HPD (Hot Plug Detect) signal, reads out the physical address allocated to the source device 2 by the sink device 1 from the virtual EDID table 21a of the DRAM 21, sets the read-out physical address as a physical address of the source device 2 itself, reads out the setting information on the display 13 of the sink device 1 included in the EDID information from the virtual EDID table 21a, sets the read-out setting information, and finishes the process. The source device 2 wirelessly transmits the video signal and the audio signal to the sink device 1 based on the set setting information. The wireless connection process performed by the controller 20 of the source device 20 is executed in the source device 3 in a manner similar to that of the source device 2.

Figure 11:
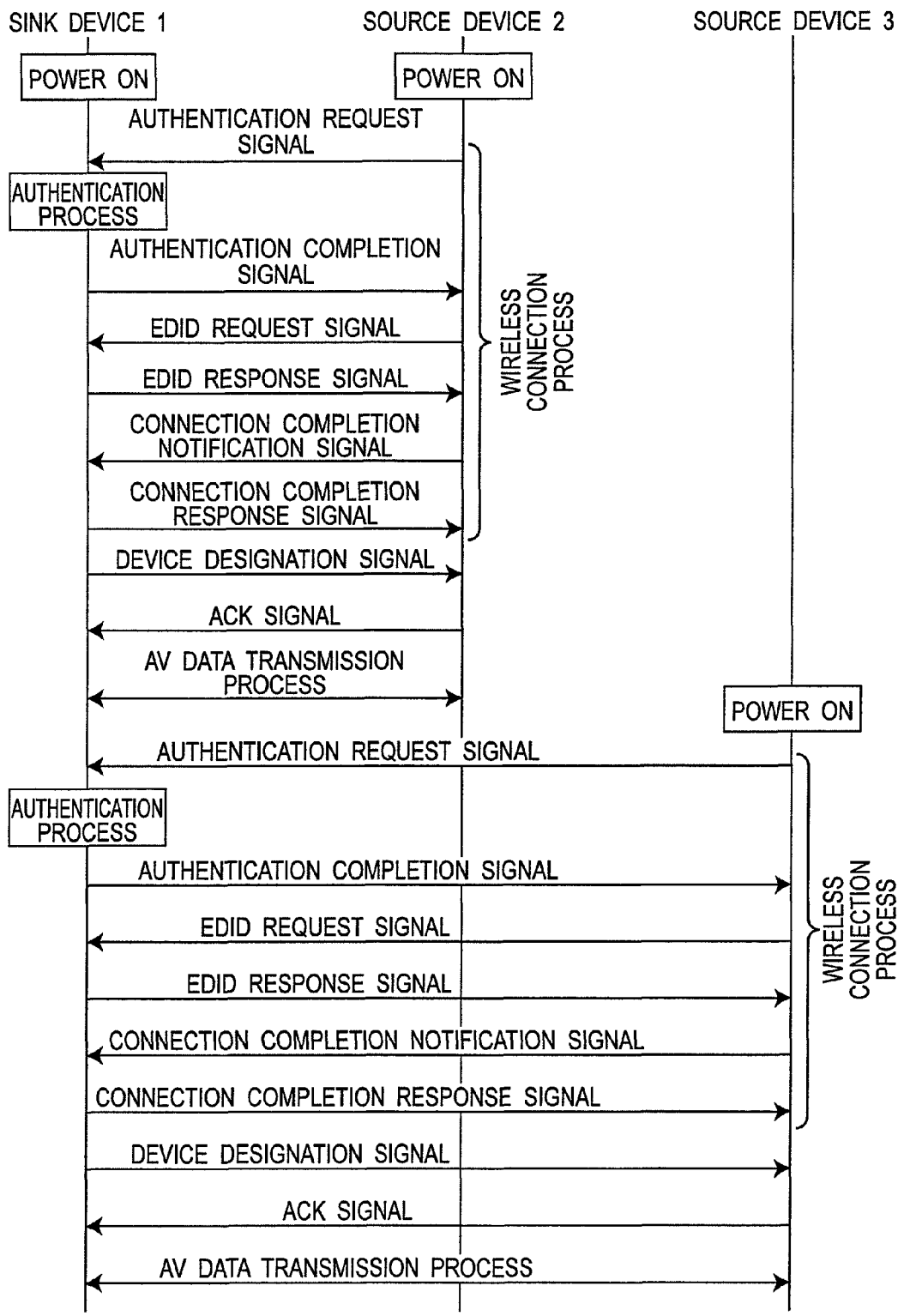
FIG. 11 is a sequence diagram showing signals transmitted and received between the sink device 1 and the source devices 2 and 3 of FIG. 1.

FIG. 11 is a sequence diagram showing signals transmitted and received between the sink device 1 and the source devices 2 and 3 of FIG. 1. Referring to FIG. 11, in the case when power the sink device 1 is turned ON, when power of the source device 2 is turned on, first of all, the source device 2 transmits the authentication request signal to the sink device 1. The sink device 1 executes the authentication process in response to the authentication request signal, and thereafter, transmits the authentication completion signal to the source device 2. In response to the authentication completion signal, the source device 2 transmits the EDID request signal to the sink device 1. In response to the EDID request signal, the sink device 1 transmits the EDID response signal including the EDID information. In response to the EDID response signal, the source device 2 transmits the connection completion notification signal to the sink device 1. In response to the connection completion notification signal, the sink device 1 transmits the connection completion response signal to the source device 2. After the completion of the above-mentioned wireless connection processes, the sink device 1 transmits a device designation signal for selecting the source device 2 as the other party of the communication, to the source device 2. In response to the device designation signal, the source device 2 transmits an ACK signal to the sink device 1. Then, an AV data transmission process between the sink device 1 and the source device 2 is started. Next, when power of the source device 3 is turned on, the sink device 1 transmits and receives the respective signals to and from the source device 3 according to a communication procedure similar to the above-mentioned procedure. In response to the EDID request signal, the sink device 1 transmits the EDID response signal including the EDID information to the source device 3. Accordingly, it is possible to reliably transmit the EDID information and the physical address allocated to the source device 2 or 3 to the source device 2 or 3, and establish a communication between the sink device 1 and the source device 2 or 3.

As described above, in the wireless communication system according to the present embodiment, the EDID information including the setting information on the display 13 is wirelessly transmitted and received between the sink device 1 and the source device 2. Accordingly, it is possible to make simple appearance without using any cables, allow one sink device 1 to easily communicate with a plurality of source devices 2 and 3, and realize high-speed reading of the setting information on the display means as compared with a prior art.

In the present embodiment, the DRAM 21 of each of the source devices 2 and 3 stores the virtual EDID table 21a, however, the present invention is not limited to this. Every time when the EDID information is required, the controller 20 may transmit the EDID request signal to the sink device 1 to acquire the EDID information.

In addition, the node information table 12b of FIG. 4 and the formats of the respective control signals shown in FIGS. 5 to 8 are given only as an example, and formats having other configurations may be used.

Further, in the sink device 1, when the controller 10 reads out the EDID table 11a from the ROM 11, the controller 10 may select and read out a part of the setting information required for the wireless communication, from the setting information in the EDID information, and store the read-out part of setting information in the EDID table 12a. Alternatively, the sink device 1 may transmit only video formats which can be displayed on the display 13 and which can be transmitted at a wireless data transmission rate at which the wireless transceiver circuit 15 can receive data, to the source device 2, among the EDID information. Concretely speaking, for example, as shown in FIG. 14, when the wireless data transmission rate is equal to or lower than 3 Gbps, for example, video format information corresponding to a resolution of 1080 p is deleted from all of the video format information of the setting information included in the EDID information. When the wireless data transmission rate is equal to or lower than 1.5 Gbps, video format information corresponding to resolutions of 1080 p, 1080 i are deleted from all of the video format information. When the wireless data transmission rate is equal to or lower than 1.3 Gbps, video format information corresponding to resolutions of 1080 p, 1080 i and 720 p are deleted from all of the video format information. When the wireless data transmission rate is equal to or lower than 0.5 Gbps, video format information corresponding to resolutions of 1080 p, 1080 i, 720 p and 480 p are deleted from all of the video format information. Then, the sink device 1 may wirelessly transmit the EDID information to the source device 2.

Still further, the EDID information on the sink device 1 is inserted into the EDID response signal and wirelessly transmitted, however, the present invention is not limited to this configuration. The EDID information on the sink device 1 may inserted into a beacon signal or the like periodically transmitted from the sink device 1, and wirelessly transmitted, in stead of the EDID response signal.

In FIG. 11, the wireless connection process is executed at a timing when the power of the source device 2 is turned on, however, the present invention is not limited to this. The wireless connection process may be executed at a timing when power of the display 13 of the sink device 1 is turned on, at a timing when the sink device 1 is connected to the source device 2 or 3, or the other timing.

Second Embodiment

Figure 12:
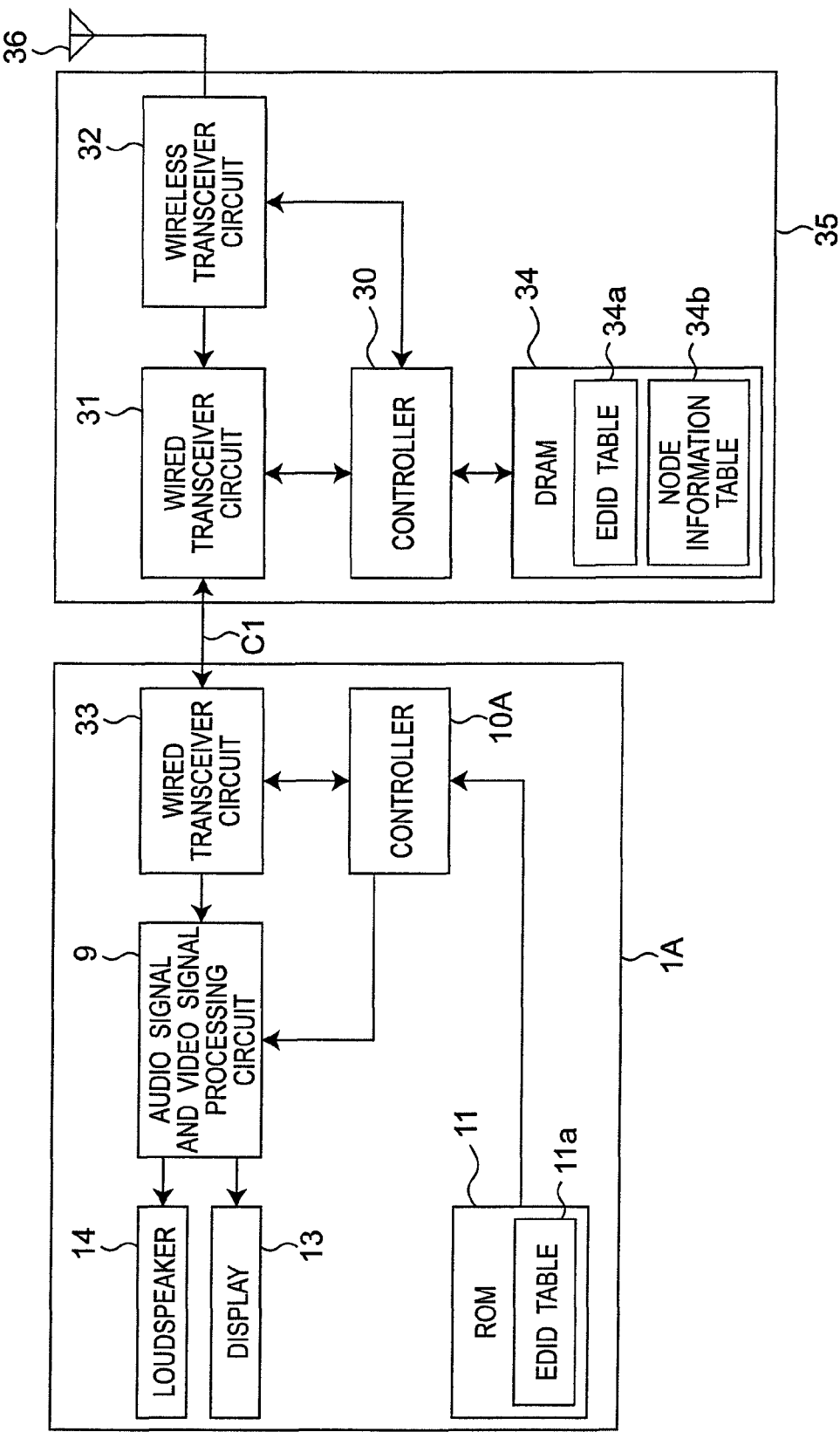
FIG. 12 is a block diagram showing a configuration of a sink device 1A and a sink-device adapter device 35 in a wireless communication system according to a second embodiment of the present invention.
Figure 13:
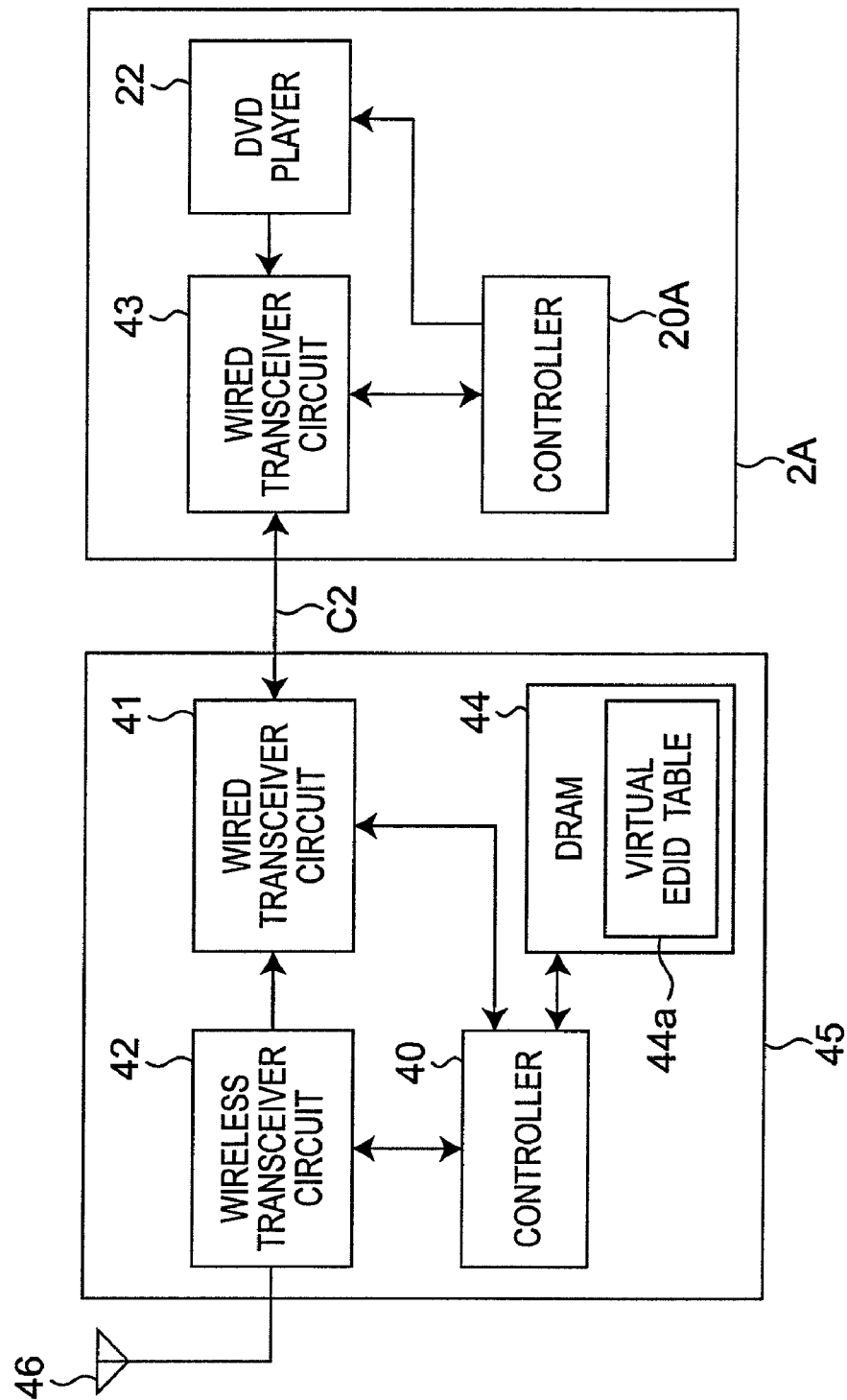
FIG. 13 is a block diagram showing a configuration of a source device 2A and a source-device adapter device 45 in the wireless communication system according to the second embodiment of the present invention.

FIG. 12 is a block diagram showing a configuration of a sink device 1A and an adapter device 35 for the sink device in a wireless communication system according to a second embodiment of the present invention. In addition, FIG. 13 is a block diagram showing a configuration of a source device 2A and an adapter device 45 for the source device in the wireless communication system according to the second embodiment of the present invention. Referring to FIGS. 12 and 13, the wireless communication system according to the present embodiment is configured to include the sink device 1A, the source device 2A, the adapter device 35 for the sink device, and the adapter device 45 for the source device. The sink device 1A of FIG. 12 is different from the sink device 1 in the wireless communication system according to the first embodiment of FIG. 2 in that the sink device 1A includes a controller 10A and a wired transceiver circuit 33 in stead of the controller 10, the DRAM 12, the wireless transceiver circuit 15, and the antenna 16 of FIG. 2. In addition, the source device 2B of FIG. 13 is different from the source device 2 in the wireless communication system according to the first embodiment of FIG. 2 in that the source device 2B includes a controller 20A and a wired transceiver circuit 43 in place of the controller 20, the DRAM 21, the wireless transceiver circuit 25, and the antenna 26 of FIG. 3. Since the wireless communication system according to the present invention is similar to that according to the first embodiment in the other respects, components denoted by the same reference symbols will not be described in detail.

Referring to FIG. 12, the wired transceiver circuit 33 of the sink device 1A receives an AV signal from the adapter device 35 for the sink device via a cable C1, and outputs the AV signal to the audio signal and video signal processing circuit 9. In addition, the wired transceiver circuit 33 receives a data signal from the adapter device 35 for the sink device via the cable C1, and outputs the data signal to the controller 10A. The controller 10A reads out the EDID table 11a from the ROM 11, and transmits the read-out EDID table 11a to the adapter device 35 for the sink device via the wired transceiver circuit 33 and the cable C1.

The adapter device 35 for the sink device is configured to include a controller 30, a wired transceiver circuit 31, a wireless transceiver circuit 32, a DRAM 34, and an antenna 36. The wired transceiver circuit 31 transmits the AV signal received from the source device 2A via the antenna 36 and the wireless transceiver circuit 32, to the sink device 1A via the cable C1. In addition, the wired transceiver circuit 31 receives the AV signal and the EDID table 11a from the sink device 1A via the cable 1C, and outputs the AV signal and the EDID table 11a to the controller 30. The DRAM 34 stores an EDID table 34a, and a node information table 34b having a configuration similar to that of the node information table 12b of FIG. 4. The EDID table 34a in the DRAM 34 includes the content of the EDID table 11a in the ROM 11. The wireless transceiver circuit 32 and the antenna 36 are configured in manners similar to those of the wireless transceiver circuit 15 and the antenna 16 of the sink device 1 included in the wireless communication system according to the first embodiment, respectively.

The controller 30 generates a data signal including control signals for setting a physical address of the source device 2A to the adapter device 35 for the sink device, and outputs the data signal to the wireless transceiver circuit 32. In addition, the controller 30 executes a wireless connection process based on the data signal received from the source device 2A via the antenna 36 and the wireless transceiver circuit 32.

Referring to FIG. 13, the wired transceiver circuit 43 of the source device 2A transmits the video signal and the audio signal read out by the DVD player to the adapter device 45 for the source device via a cable C2. In addition, the wired transceiver circuit 43 outputs control information received from the adapter device 45 for the source device via the cable C2 to the controller 20A. The controller 20A controls the DVD player 22 based on the control information outputted from the wired transceiver circuit 43.

The adapter device 45 for the source device is configured to include a controller 40, a wired transceiver circuit 41, a wireless transceiver circuit 42, a DRAM 44, and an antenna 46. The wired transceiver circuit 41 transmits the AV signal received from the source device 2A via the cable C2, to the sink device 1A via the antenna 46 and the wireless transceiver circuit 42. In addition, the wired transceiver circuit 41 transmits the data signal received from the adapter device 35 for the sink device via the wireless transceiver circuit 42 and the antenna 46, to the adapter device 35 for the sink device via the cable C2. The DRAM 44 stores a virtual EDID table 44a. The wireless transceiver circuit 42 and the antenna 46 are configured in manners similar to those of the wireless transceiver circuit 25 and the antenna 26 of the source device 2 included in the wireless communication system according to the first embodiment, respectively.

The controller 40 generates a data signal including control signals for setting the physical address of the source device 2A to the adapter device 35 for the sink device, and outputs the data signal to the wireless transceiver circuit 42. In addition, the controller 40 executes a wireless connection process based on the data signal received from the adapter device 35 for the sink device via the antenna 46 and the wireless transceiver circuit 42.

As described above, in the wireless communication system according to the second embodiment, by attaching the adapter device 35 for the sink device to the sink device 1A and attaching the adapter device 45 for the source device to the source device 2A, even when the sink device 1A and the source device 2A each including only the wired interface, the EDID information on the sink device 1A can be wirelessly read out, and the physical address of the source device 2A can be ser via the wireless circuit.

In the first and second embodiments, the DRAMS 12 and 21, and the DRAMS 34 and 44 are used, respectively, however, the present invention is not limited to the configurations. Memory devices having higher-rate such as SRAMs may be used in stead of the DRAMs.

According to the sink device, the source device, the adapter device for the sink device, the adapter device for the source device, the wireless communication system, and the method of controlling the wireless communication system according to the present invention, the setting information on the display means is wirelessly transmitted and received via a wireless circuit between the sink device and the source device. Accordingly, it is possible to make simple appearance without using any cables, allow one sink device to easily communicate with a plurality of source devices, and realize high-speed reading of the setting information on the display means as compared with a prior art.

The sink device, the source device, the adapter device for the sink device, the adapter device for the source device, the wireless communication system, and the method of controlling the wireless communication system according to the present invention are applicable to an audiovisual (AV) system such as a DVD player or a television receiver.

The invention claimed is:

1. A sink device for use in a wireless communication system comprising a source device for wirelessly transmitting a video signal, and the sink device for receiving the wirelessly transmitted video signal and displaying the received video signal on a display unit, the sink device comprising:
 a first storage unit for storing setting information on the display unit;
 a wireless transceiver for wirelessly receiving a predetermined first wireless data signal from the source device, and for wirelessly transmitting a predetermined second wireless data signal to the source device; and
 a controller for reading out the setting information from the first storage unit, and controlling the wireless transceiver to wirelessly transmit the second wireless data signal including the read-out setting information,
 wherein, upon wirelessly receiving the first wireless data signal from the source device, the controller reads out from a node information table a physical address corresponding to wireless device identification information on the source device included in the wirelessly received first wireless data signal, the node information table storing the wireless device identification information on the source device included in the first wireless data signal from the source device, and the physical address allocated to the source device, so that the wireless device identification information corresponds to the physical address, and
 wherein the controller controls the wireless transceiver to wirelessly transmit the second wireless data signal including the physical address and the read-out setting information, to the source device.

2. The sink device as claimed in claim 1, further comprising a second storage unit for storing the node information table,
 wherein the controller reads out the setting information from the first storage unit, stores the read-out setting information in the second storage unit, reads out the setting information from the second storage unit, and controls the wireless transceiver to wirelessly transmit the second wireless data including the read-out physical address and the setting information read out from the second storage unit.

3. The sink device as claimed in claim 2, wherein a readout rate for the second storage unit is higher than a readout rate for the first storage unit.

4. The sink device as claimed in claim 2, wherein, upon reading out the setting information from the first storage unit and storing the read-out setting information in the second storage unit, the controller selects at least a part of the setting information and stores the selected part of the setting information in the second storage unit.

5. The sink device as claimed in claim 4, wherein at least the part of the setting information is setting information that can be transmitted at a wireless transmission rate at which the sink device can receive it.

6. The sink device as claimed in claim 1, wherein the second wireless data signal further includes the wireless device identification information on the source device included in the first wireless signal from the source device.

7. An adapter device for a sink device, for use in a wireless communication system comprising an adapter device for a source device and the adapter device for the sink device, the adapter device for the sink device wirelessly transmitting a video signal, the adapter device for the source device receiving the wirelessly transmitted video signal and outputting the received video signal to a display unit of the sink device to display the received video signal thereon, the adapter device for the sink device comprising:
 a wireless transceiver for wirelessly receiving a predetermined first wireless data signal from the adapter device for the source device, and for wirelessly transmitting a predetermined second wireless data signal to the adapter device for the source device;
 a storage unit for storing setting information read out from the sink device; and
 a controller for reading out the setting information from the storage unit, and controlling the wireless transceiver to wirelessly transmit the second wireless data signal including the read-out setting information, to the adapter device for the source device,
 wherein the storage unit further stores a node information table for storing wireless device identification information on the source device included in the first wireless data signal from the adapter device for the source device, and a physical address allocated to the source device, so that the wireless device identification information corresponds to the physical address,
 wherein, upon wirelessly receiving the first wireless data signal from the adapter device for the source device, the controller reads out from the node information table the physical address corresponding to the wireless device identification information included in the wirelessly received first wireless data signal, and
 wherein the controller controls the wireless transceiver to wirelessly transmit the second wireless data signal including the read-out physical address and the setting information read out from the storage unit, to the adapter device for the source device.

8. A wireless communication system comprising an adapter device for a source device and an adapter device for a sink device, the adapter device for the sink device wirelessly transmitting a video signal, the adapter device for the source device receiving the wirelessly transmitted video signal and outputting the received video signal to a display unit of the sink device to display the received video signal thereon,
 wherein the adapter device for the sink device comprises:
 a first wireless transceiver for wirelessly receiving a predetermined first wireless data signal from the adapter device for the source device, and for wirelessly transmitting a predetermined second wireless data signal to the adapter device for the source device;
 a storage unit for storing setting information read out from the sink device; and a controller for reading out the setting information from the storage unit, and controlling the first wireless transceiver to wirelessly transmit the second wireless data signal including the read-out setting information, to the adapter device for the source device, wherein the storage unit further stores a node information table for storing wireless device identification information on the source device included in the first wireless data signal from the adapter device for the source device, and a physical address allocated to the source device, so that the wireless device identification information corresponds to the physical address, wherein, upon wirelessly receiving the first wireless data signal from the adapter device for the source device, the controller reads out from the node information table the physical address corresponding to the wireless device identification information included in the wirelessly received first wireless data signal, wherein the controller controls the first wireless transceiver to wirelessly transmit the second wireless data signal including the read-out physical address and the setting information read out from the storage unit, to the adapter device for the source device, and wherein the adapter device for the source device comprises a second wireless transceiver for wirelessly receiving the second wireless data signal including the setting information and wirelessly transmitted from the adapter device for the sink device, and for wirelessly transmitting a video signal to the adapter device for the sink device based on the setting information.

9. A method of controlling a wireless communication system comprising an adapter device for a source device and an adapter device for a sink device, the adapter device for the sink device wirelessly transmitting a video signal, the adapter device for the source device receiving the wirelessly transmitted video signal and outputting the received video signal to a display unit of the sink device to display the received video signal thereon, wherein the adapter device for the sink device comprises a storage unit for storing setting information read out from the sink device, wherein the storage unit further stores a node information table for storing wireless device identification information on the source device included in a first wireless data signal from the adapter device for the source device, and a physical address allocated to the source device, so that the wireless device identification information corresponds to the physical address, and wherein the method including the steps of:

at the adapter device for the sink device, storing setting information read out from the sink device in the storage unit;

at the adapter device for the sink device, reading out the setting information from the storage unit;

at the adapter device for the sink device, upon wirelessly receiving the first wireless data signal from the adapter device for the source device, reading out from the node information table the physical address corresponding to the wireless device identification information included in the wirelessly received first wireless data signal;

at the adapter device for the sink device, wirelessly transmitting a second wireless data signal including the read-out physical address and the setting information read out from the storage unit, to the adapter device for the source device; and at the adapter device for the source device, wirelessly receiving the second wireless data signal including the setting information and wirelessly transmitted from the adapter device for the sink device, and wirelessly transmitting a video signal to the adapter device for the sink device based on the setting information.

* * * * *